(12) United States Patent
Son et al.

(10) Patent No.: US 9,075,469 B2
(45) Date of Patent: Jul. 7, 2015

(54) STEREOSCOPIC LIQUID CRYSTAL DISPLAY DEVICE HAVING TOUCH PANEL AND METHOD FOR MANUFACTURING THE SAME

(75) Inventors: Jung-Eun Son, Seoul (KR); Tae-Hoon Kim, Daegu (KR)

(73) Assignee: LG Display Co., Ltd., Seoul (KR)

( * ) Notice: Subject to any disclaimer, the term of this patent is extended or adjusted under 35 U.S.C. 154(b) by 292 days.

(21) Appl. No.: 12/912,158

(22) Filed: Oct. 26, 2010

(65) Prior Publication Data

US 2011/0096251 A1   Apr. 28, 2011

(30) Foreign Application Priority Data

Oct. 27, 2009   (KR) .......................... 10-2009-0102152

(51) Int. Cl.
| | | |
|---|---|---|
| *G02F 1/1335* | (2006.01) | |
| *G06F 3/041* | (2006.01) | |
| *G06F 3/045* | (2006.01) | |
| *G02F 1/1333* | (2006.01) | |
| *H04N 13/04* | (2006.01) | |

(52) U.S. Cl.
CPC .......... *G06F 3/0412* (2013.01); *G02F 1/13338* (2013.01); *H04N 13/0404* (2013.01)

(58) Field of Classification Search
CPC .............. G06F 3/0412; G02F 1/13338; H04N 13/0404
USPC ........................ 349/200, 12, 15; 345/173–174
See application file for complete search history.

(56) References Cited

U.S. PATENT DOCUMENTS

| | | | | |
|---|---|---|---|---|
| 7,602,451 B2* | 10/2009 | Hinata | ............................. | 349/12 |
| 2008/0259233 A1* | 10/2008 | Krijn et al. | ...................... | 349/15 |
| 2009/0015738 A1* | 1/2009 | Hong et al. | ...................... | 349/15 |
| 2009/0122210 A1* | 5/2009 | Im | ................................... | 349/15 |
| 2009/0262096 A1* | 10/2009 | Teramoto | ...................... | 345/174 |

FOREIGN PATENT DOCUMENTS

| | | |
|---|---|---|
| CN | 101299103 | 11/2008 |
| CN | 101344698 | 1/2009 |
| KR | 10-0824539 | 4/2008 |
| WO | 2009/105544 | 8/2009 |

OTHER PUBLICATIONS

Chinese Office Action dated Dec. 29, 2011, issued in a corresponding Chinese patent application.

* cited by examiner

*Primary Examiner* — Nathanael R Briggs
(74) *Attorney, Agent, or Firm* — Morgan, Lewis & Bockius LLP

(57) ABSTRACT

A stereoscopic liquid crystal display device includes a liquid crystal panel configured by including a first substrate and a second substrate facing into each other, and a first liquid crystal layer filling a space between the first substrate and the second substrate, an adhesion layer formed on the liquid crystal panel, and a touch and stereoscopic image lens layer including a third substrate and a fourth substrate facing into each other and formed on the adhesion layer, a second liquid crystal layer formed between the third substrate and the fourth substrate, a plurality of first electrodes formed on the third substrate, a second electrode formed on an entire surface of a surface of the fourth substrate facing into the second liquid crystal layer, and a third electrode and a fourth electrode formed on the fourth substrate for detecting a touch position.

9 Claims, 5 Drawing Sheets

STEREOSCOPIC LIQUID CRYSTAL DISPLAY DEVICE HAVING TOUCH PANEL AND METHOD FOR MANUFACTURING THE SAME

This application claims the benefit of the Korean Patent Application No. 10-2009-0102152, filed on Oct. 27, 2009, which is hereby incorporated by reference as if fully set forth herein.

BACKGROUND OF THE INVENTION

1. Field of the Invention

The present invention relates to a liquid crystal display device and, more particularly, to a stereoscopic liquid crystal display device having a touch panel and a method for manufacturing the same, wherein the liquid crystal display device includes a touch panel and an electrically-driven liquid crystal lens realizing a stereoscopic image, thereby being capable of performing a function of displaying stereoscopic images and touch detection.

2. Discussion of the Related Art

Recently, as the world has reached a full-scale information age, the field of display that can visually express electric information signals has developed at a vast rate. And, in order to meet with the requirements of such development, various types of flat display devices having excellent functions and characteristics, such as compact size, light weight, low power consumption rate, and so on, have been developed so replace the cathode ray tube (CRT) displays.

Detailed examples of such flat display devices may include liquid crystal display (LCD) devices, plasma display panel (PDP) devices, field emission display (FED) devices, electroluminescence display (ELD) devices, and so on. More specifically, these flat display devices commonly include a flat display panel realizing images as an essential element. Herein, a flat display device has the structure of a pair of transparent insulation layers bonded so as to face into each other between unique light-emitting or polarization material layers.

Herein, the liquid crystal display device uses an electric field to adjust light transmissivity of the liquid crystals, thereby display an image. In order to do so, an image display device consists of a display panel having liquid crystal cells, and a driving circuit for driving a backlight unit and the liquid crystal cells, wherein the backlight unit emits light rays to the display panel.

The display panel is configured so that a plurality of gate lines and a plurality of data lines crossover one another, so as to define a plurality of unit pixel regions. At this point, each pixel region is provided with a thin film transistor array substrate and a color filter array substrate facing into each other, a spacer maintaining a predetermined cell gap between the thin film transistor array substrate and the color filter array substrate, and liquid crystal filling the cell gap.

A thin film transistor array substrate consists of gate lines and data lines, a thin film transistor formed as a switching device at each crossing point between the gate lines and the data lines, pixel electrodes formed in liquid crystal cell units and connected to the thin film transistor, and an alignment layer deposited thereon. Each of the gate lines and the data lines receives a signal from driving circuits through a pad unit.

The thin film transistor responds to a scan signal supplied to the gate line, so as to a supply pixel voltage signal, which is supplied to the data line, to the pixel electrode.

The color filter array substrate consists of color filters formed in liquid crystal cell units, a black matrix for identifying the color filters and for reflecting external light, common electrodes commonly supplying reference voltage to the liquid crystal cells, and an alignment layer deposited thereon.

Thereafter, the thin film transistor array substrate and the color filter array substrate that are separately configured, as described above, are aligned and bonded so as to face into each other. Subsequently, liquid crystal is injected between the two substrates, which are then sealed.

Recently, demands for adding a touch panel to the liquid crystal display device having the above-described structure have been increasing. Herein, the touch panel may recognize specific portions touched by the hand of the user or by a separate input means and may transmit separate information with respect to recognized portion of the screen (or panel).

Additionally, apart from the touch panel, the liquid crystal display device is also separately provided with a lenticular lens for displaying stereoscopic images.

Hereinafter, the related art stereoscopic liquid crystal display device having a touch panel fixed thereto will now be described in detail with reference to the accompanying drawing(s).

FIG. 1 illustrates a cross-sectional view showing a liquid crystal display device having a general touch panel fixed thereto.

Referring to FIG. 1, the liquid crystal display device having a general touch panel fixed thereto is sequentially provided with a liquid crystal panel 50, a lens layer 60, and a touch panel layer 70. The liquid crystal display device is also provided with a first adhesion layer 55 and a second adhesion layer 65 between each interface.

Herein, each of the first adhesion layer 55 and the second adhesion layer 65 corresponds to a double-sided adhesion layer respectively adhering (or bonding) the liquid crystal layer panel 50 to the lens layer 60 and the lens layer 60 to the touch panel layer 70.

Also, the liquid crystal panel 50 includes a first substrate 10 and a second substrate 20 facing into each other, a liquid crystal layer 25 filling the space between the first substrate 10 and the second substrate 20, a color filter layer 21 (21a, 21b, and 21c) formed on each surface of the second substrate 20 touching (or contacting) the liquid crystal layer 25, and a first polarizing layer 31 and a second polarizing layer 32 each formed on a rear surface of the first substrate 10 and the second substrate 20.

The lens layer 60 is placed above the liquid crystal panel 50, the first adhesion layer 55 being place between the lens layer 60 and the liquid crystal panel 50. Herein, the lens layer 60 includes a first plate layer 41, a lenticular lens array 45 having a lens function on the first plate 41, and a second plate layer 42 flattening the lenticular lens array 45.

Furthermore, the touch panel layer 70 is separately placed above the lens layer 60, the second adhesion layer 65 being placed between the touch panel layer 70 and the lens layer 60. Herein, the internal structure of the touch panel layer 70 may vary depending upon the driving method of the touch panel layer 70.

As described above, the related art liquid crystal display device having a touch panel fixed thereto is configured of a touch panel having a touch function, and a separate lens layer having a lens function for displaying stereoscopic image, each layer having an adhesion layer deposited therebetween. Herein, a considerable number of film adhesion processes and bonding processes is required for each adhesion layer, and a considerable number of plates or glasses that are to be provided to the touch panel and the lens layer is required. Therefore, in manufacturing a display device having such complex functions, a high fabrication cost is required.

As described above, the related art liquid crystal display device having a touch panel fixed thereto has the following disadvantages.

For example, in case of a display device separately configuring a touch panel having a touch function, and a lens layer having a lens function for a stereoscopic image display, an adhesion layer should be provided between each layer. Herein, a considerable number of film adhesion processes and bonding processes are required to be performed on each adhesion layer. Accordingly, a number of plates and glasses should be provided in the touch panel and the lens layer. Thus, the processes for forming the display device having such complex functions results in an increase in manufacturing cost.

Also, even when being provided with a configuration layer having functions other than the lens layer of the above-described example, the same problem may occur due to the layers required in between the adhesion layers.

SUMMARY OF THE INVENTION

Accordingly, the present invention is directed to a stereoscopic liquid crystal display device having a touch panel and a method for manufacturing the same that substantially obviate one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a stereoscopic liquid crystal display device includes a liquid crystal panel configured by including a first substrate and a second substrate facing into each other, and a first liquid crystal layer filled between the first and second substrates; an adhesion layer formed on the liquid crystal panel; and a touch and stereoscopic image lens layer formed on the adhesion layer including a third substrate and a fourth substrate facing into each other and a second liquid crystal layer between the third and fourth substrates, a plurality of first electrodes formed on the third substrate, a second electrode formed on an entire surface of one surface of the fourth substrate facing into the second liquid crystal layer, and a third electrode and a fourth electrode formed on the other surface of the fourth substrate for detecting a touch position.

The stereoscopic liquid crystal display device may further include a cover glass on an uppermost portion of the touch and stereoscopic image lens layer.

In this case, the third electrode and the fourth electrode of the touch and stereoscopic image lens layer may be formed on the same layer and spaced apart from one another. At this point, the stereoscopic liquid crystal display device further includes a third electrode connecting pattern on the third substrate; and a first insulating layer covering the third electrode connecting pattern, having a first contact hole on one portion of the third electrode connecting pattern, and formed on an entire surface of the third substrate, wherein the third electrode is connected to the third electrode connecting pattern through the first contact hole.

Alternatively, the third electrode and the fourth electrode may be formed on different layers and having the first insulating layer placed therebetween, and the third electrode and the fourth electrode may be formed in directions crossing each other.

Meanwhile, the first electrodes may be formed in the same alignment at a period of one pitch of a lens. At this point, the electrically-driven liquid crystal lens may be defined in the touch and stereoscopic image lens layer by applying a voltage value gradually increasing from a center portion to an edge portion for each pitch of a lens to the first electrodes, and by applying a voltage value to the second electrode as the same voltage value with the applied voltage value to the center portion of the first electrode.

Also, the first to fourth electrodes may each be formed of a transparent electrode.

In another aspect of the present invention, a method of manufacturing a stereoscopic liquid crystal display device includes configuring a liquid crystal panel by including a first substrate and a second substrate facing into each other, and a first liquid crystal layer filled between the first and second substrates; forming a touch and stereoscopic image lens layer including a third substrate and a fourth substrate facing into each other, and, a second liquid crystal layer between the third and fourth substrates, a plurality of first electrodes formed on the third substrate, a second electrode entirely formed on one surface of the fourth substrate facing into the second liquid crystal layer, and a third electrode and a fourth electrode formed on the other surface of fourth substrate for detecting a touch position; and bonding the liquid crystal panel and the touch and stereoscopic image lens layer with an adhesion layer positioned between the liquid crystal panel and the touch and stereoscopic image lens layer.

Also, the method of manufacturing a stereoscopic liquid crystal display device may further include forming a cover glass on an uppermost portion of the touch and stereoscopic image lens layer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, the stereoscopic liquid crystal display device having a touch panel and a method of manufacturing the same will now be described in detail with reference to the accompanying drawings.

Figure 1:
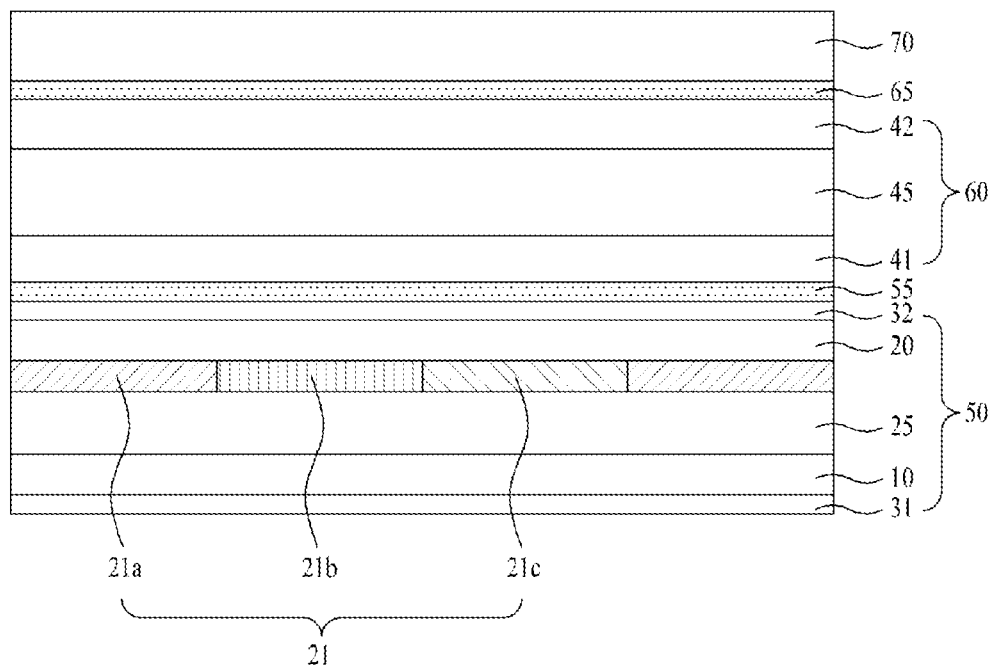
FIG. 1 illustrates a cross-sectional view showing a liquid crystal display device having a general touch panel fixed thereto.
Figure 2:
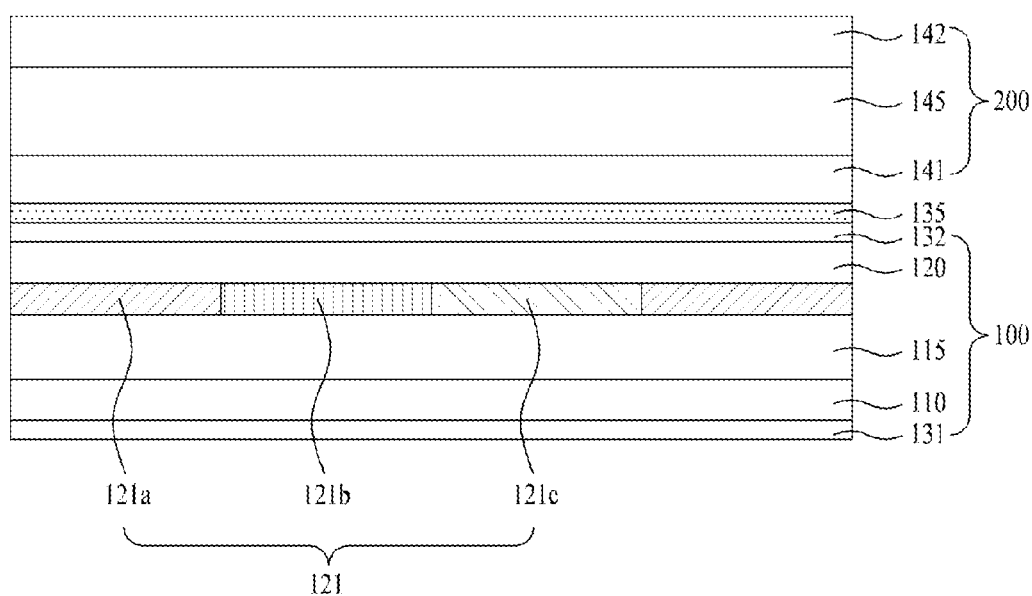
FIG. 2 illustrates a cross-sectional view showing a stereoscopic liquid crystal display device having a touch panel according to the present invention.

FIG. 2 illustrates a cross-sectional view showing a stereoscopic liquid crystal display device having a touch panel according to the present invention.

Referring to FIG. 2, the stereoscopic liquid crystal display device having a touch panel according to the present invention broadly consists of a liquid crystal display panel 100 and a touch and stereoscopic image lens layer 200, wherein the touch and stereoscopic image lens layer 200 is formed above the liquid crystal display panel 100, and wherein an adhesion layer 135 of an interface is formed between the liquid crystal display panel 100 and the touch and stereoscopic image lens layer 200.

Herein, the liquid crystal display panel 100 includes a first substrate 110 and a second substrate facing into each other, a first liquid crystal layer 115 filling a space between the first substrate 110 and the second substrate 120, a color filter layer 121 (121*a*, 121*b*, and 121*c*) formed on each surface of the second substrate 120 touching (or contacting) the first liquid crystal layer 115, and a first polarizing layer 131 and a second polarizing layer 132 each formed on a rear surface of the first substrate 110 and the second substrate 120.

The touch and stereoscopic image lens layer 200 includes an electrically-driven liquid crystal lens electrode unit 141 and a touch detector 142 facing into each other, and a second liquid crystal layer 145 filling a space between the electrically-driven liquid crystal lens electrode unit 141 and the touch detector 142.

Herein, the electrically-driven liquid crystal lens electrode unit 141 is provided with fine electrodes functioning in the electrically-driven liquid crystal lens. And, the touch detector 142 provided with an electrode formed on an entire surface of a first layer touching the second liquid crystal layer 145. Therefore, a combination of the fine electrodes on the electrically-driven liquid crystal lens electrode unit 141 and the electrode of the touch detector 142, the electrically-driven liquid crystal lens created by an electric field and formed on the second liquid crystal layer 145 can function.

Also, in the touch detector 142, electrodes having touch detecting functions are further provided on a second surface (not shown) that does not touch the second liquid crystal layer 145.

More specifically, by configuring a touch panel and an electrically-driven liquid crystal lens within a single panel, the stereoscopic liquid crystal display device having a touch panel may reduce a combination of two pairs of glasses, which was used to form each of the touch panel and the electrically-driven liquid crystal lens, to a combination of one pair of glasses. Thus, while reducing the number of glasses used, adhesion layers that were used to bond the glasses are no longer required, and the bonding process may be omitted, thereby simplifying the structure of the stereoscopic liquid crystal display device and its manufacturing process.

Hereinafter, the structure of the stereoscopic liquid crystal display device having a touch panel according to each embodiment of the present invention will now be described in detail.

First Embodiment

Figure 3:
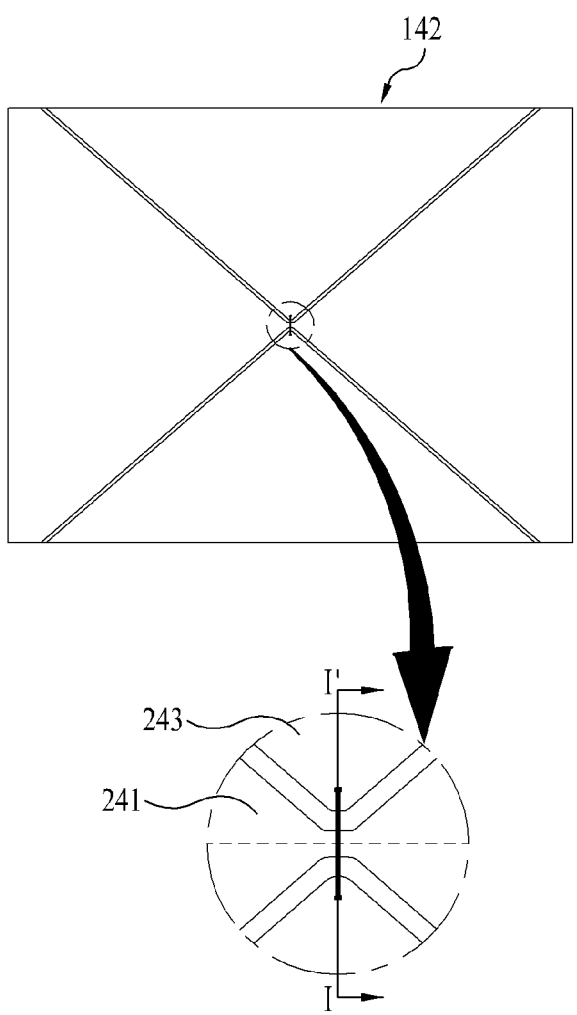
FIG. 3 illustrates a plane view showing a touch and stereoscopic image lens layer, in a stereoscopic liquid crystal display device having a touch panel according to a first embodiment of the present invention.

FIG. 3 illustrates a plane view showing a touch and stereoscopic image lens layer, in a stereoscopic liquid crystal display device having a touch panel according to a first embodiment of the present invention. And, FIG. 4 illustrates a cross-sectional view taken along line I to I' of FIG. 3.

Figure 4:
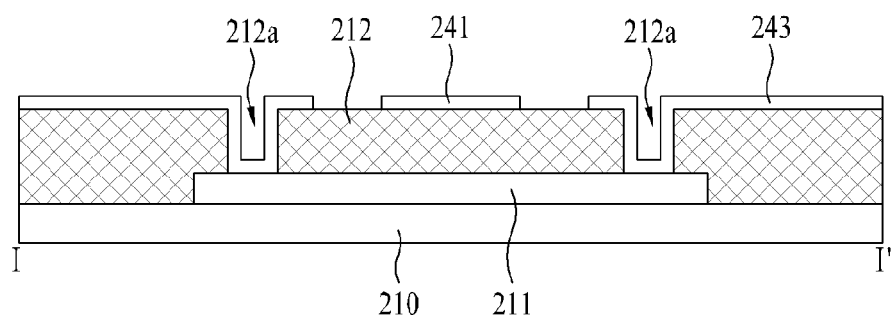
FIG. 4 illustrates a cross-sectional view taken along line I to I' of FIG. 3.

Referring to FIG. 3 and FIG. 4, in the stereoscopic liquid crystal display device having a touch panel according to the first embodiment of the present invention, a fourth substrate 210 showing a touch function unit of the touch and stereoscopic image lens layer, is provided with a third electrode 243 performing detection in an X-axis and a fourth electrode 241 performing detection in a Y-axis.

Herein, the third electrode 243 is electrically connected to a third electrode connecting pattern 211 formed on the lower portion of the touch and stereoscopic image lens layer, through a third contact hole 212*a*, which is provided in a first insulating layer 212 between the third electrode 243 and the third electrode connecting pattern 211. As shown in FIG. 3 and FIG. 4, the contact is realized in the form of bridge.

At this point, the fourth electrode 241 is formed in the same layer as the third electrode 243, the third electrode 243 and the fourth electrode 241 are spaced apart from one another and each controlled by a different signal supply.

Figure 5:
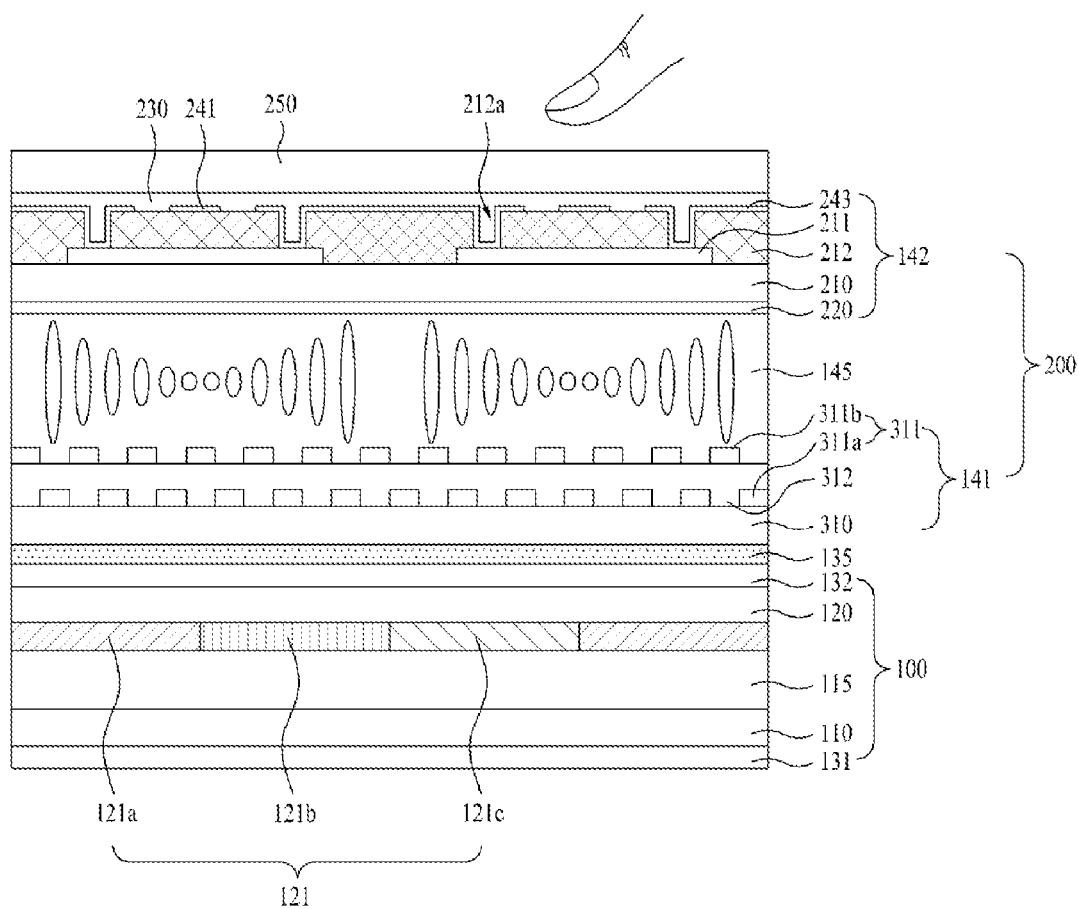
FIG. 5 illustrates a detailed cross-sectional view of the stereoscopic liquid crystal display device having a touch panel according to the first embodiment of the present invention.

FIG. 5 illustrates a detailed cross-sectional view of the stereoscopic liquid crystal display device having a touch panel according to the first embodiment of the present invention.

As shown in FIG. 5, the stereoscopic liquid crystal display device having a touch panel according to the first embodiment of the present invention consists of a liquid crystal panel 100, a touch and stereoscopic image lens layer 200, and an adhesion layer 135 deposited between the liquid crystal panel 100 and the touch and stereoscopic image lens layer 200.

Herein, the adhesion layer 135 is a double-sided adhesion layer bonding the liquid crystal panel 100 and the touch and stereoscopic image lens layer 200.

The liquid crystal panel 100 includes a first substrate 110 and a second substrate facing into each other, a first liquid crystal layer 115 filling a space between the first substrate 110 and the second substrate 120, a color filter layer 121 (121*a*, 121*b*, and 121*c*) formed on each surface of the second substrate 120 touching (or contacting) the first liquid crystal layer 115, and a first polarizing layer 131 and a second polarizing layer 132 each formed on a rear surface of the first substrate 110 and the second substrate 120.

Herein, although it is not shown n the drawing, the first substrate 110 further includes a plurality of gate lines (not shown) and a plurality of data lines (not shown) crossing over one another to form a pixel region. And, each pixel region includes a pixel electrode (not shown), and a thin film transistor formed at the crossing point between the gate line and the data line.

Additionally, the second substrate 120 may further include a color filter layer 121 and a block matrix (not shown) corresponding to a region that is not a pixel region. Furthermore, the second substrate 120 may further include a common electrode formed on an entire surface including the back matrix and the color filter layer.

And, in the touch and stereoscopic image lens layer 200, first electrodes 311 (311a and 311b) configured of a plurality of fine electrodes formed on different layers, a third insulating layer 312 covering the first electrodes 311a of a first group among the first electrodes and formed on a third substrate 310, and first electrodes 311b of a second group among the first electrodes formed on the third insulating layer 312 are formed on the third substrate 310, which is equivalent to a lower layer. Herein, the first electrodes 311b of the second group are positioned in between the first electrodes 311a of the first group.

Furthermore, a second electrode 220 corresponds to an electrode formed on an entire surface of a fourth substrate facing into a second liquid crystal layer 145 of a fourth substrate, which is equivalent to the upper substrate.

The above-described touch and stereoscopic image lens layer 200 is provided with a plurality of first electrodes 311 for each pitch of the lens. And, for each pitch, the alignment of the first electrodes is repeated in the same format. The voltage starting from a center pitch to the edge of the lens is gradually increased and applied to the first electrodes 311, and the same voltage applied to the center first electrodes 311 is applied to the second electrode 220, thereby creating a parabolic potential surface within the second liquid crystal layer 145. Thus, a lens effect may be optically obtained. When the starting from the center pitch to the edge of the lens is gradually increased, a parabolic lens having a curvature increasing from the center pitch to the edge (i.e., the height of the lens being the highest at the center, and the height of the lens being the lowest) may be obtained. As described above, when applying voltage to the first electrodes 311 and the second electrode 220, an electrically-driven liquid crystal lens is formed on the second liquid crystal layer 145, so as to output the image being outputted from the liquid crystal panel 100 as a left-view image and a right-view image, thereby enabling the user to visually sense a stereoscopic image.

A pitch (P) refers to a horizontal width of a lens region created on the touch and stereoscopic image lens layer 200. Herein, the lens regions do not have a physical lens form, such as the shown convex lens.

At this point, the first electrodes 311 are divided into a type of fine electrodes, and the number of fine electrodes may be adjusted depending upon the supplied amount of voltages. And, as the number of fine electrodes for each pitch increases, the curvature of the lens may become smoother. Also, the first electrodes may be formed to have the same width and to be spaced apart from one another at a same distance. In some cases, the lens may be formed by gradually increasing or decreasing the width and intervals of the electrodes starting from the center to the edge.

Additionally, as shown in the drawing, the first electrodes may be formed in different layers, may be provided with a plurality of interlayer dielectric films, and may be divided into two or more layers. Also, the electrodes may be spaced apart from one another on the same layer. The required curvature of the lens may be taken into consideration so as to determine the number of interlayer dielectric films and intervals (or distance), at which the interlayer dielectric films are spaced apart from one another.

Meanwhile, when voltage is not applied to the first electrodes 311 and the second electrode 220, the liquid crystal layer 145 performs the role of a simple transparent layer displaying an image being outputted from the liquid crystal panel 100 without any refraction of the outputted image.

Accordingly, the image of the liquid crystal panel 100 is delivered (or transmitted) to the user without any distinction in the field of vision, thereby allowing the user to recognize the outputted image as a two-dimensional image.

Also, a surface (upper surface) of the fourth substrate 210 that does not face into the second liquid crystal layer 145 sequentially consists of a third electrode connecting pattern 211, a first contact hole 212a defined by exposing a portion of the third electrode connecting pattern 211, a first insulating layer 212 formed to cover the fourth substrate 210 including the third electrode connecting pattern 211, a third electrode 243 connected to the third electrode connecting pattern 211 within the first contact hole 212a formed on the first insulating layer 212, and a second insulating layer 230 spaced apart from the third electrode 243 and formed the first insulating layer 212 so as to perform planarization.

Herein, the third electrode 243 corresponds to an electrode formed to detect the position of a touch along an X-axis, and the fourth electrode 241 corresponds to an electrode formed to detect the position of a touch along a Y-axis. At this point, the detection of a touch is performed by applying different voltages to the third electrode 243 and the fourth electrode 241, and by reading a change in an amount of blackout generated between the third electrode 243 and the fourth electrode 241 of the touched area.

Furthermore, a cover glass may be additionally formed on the second insulating layer 230 in order to protect the touch and stereoscopic image lens layer 200.

Herein, in some cases, the second insulating layer 230 may be omitted.

Finally, the first to fourth electrodes 311, 220, 241, and 243 may be formed of transparent electrodes, such as indium tin oxide (ITO), indium zinc oxide (IZO), or indium tin-zinc oxide (ITZO), thereby preventing a decrease in aperture ratio and penetration ratio.

Second Embodiment

Figure 6:
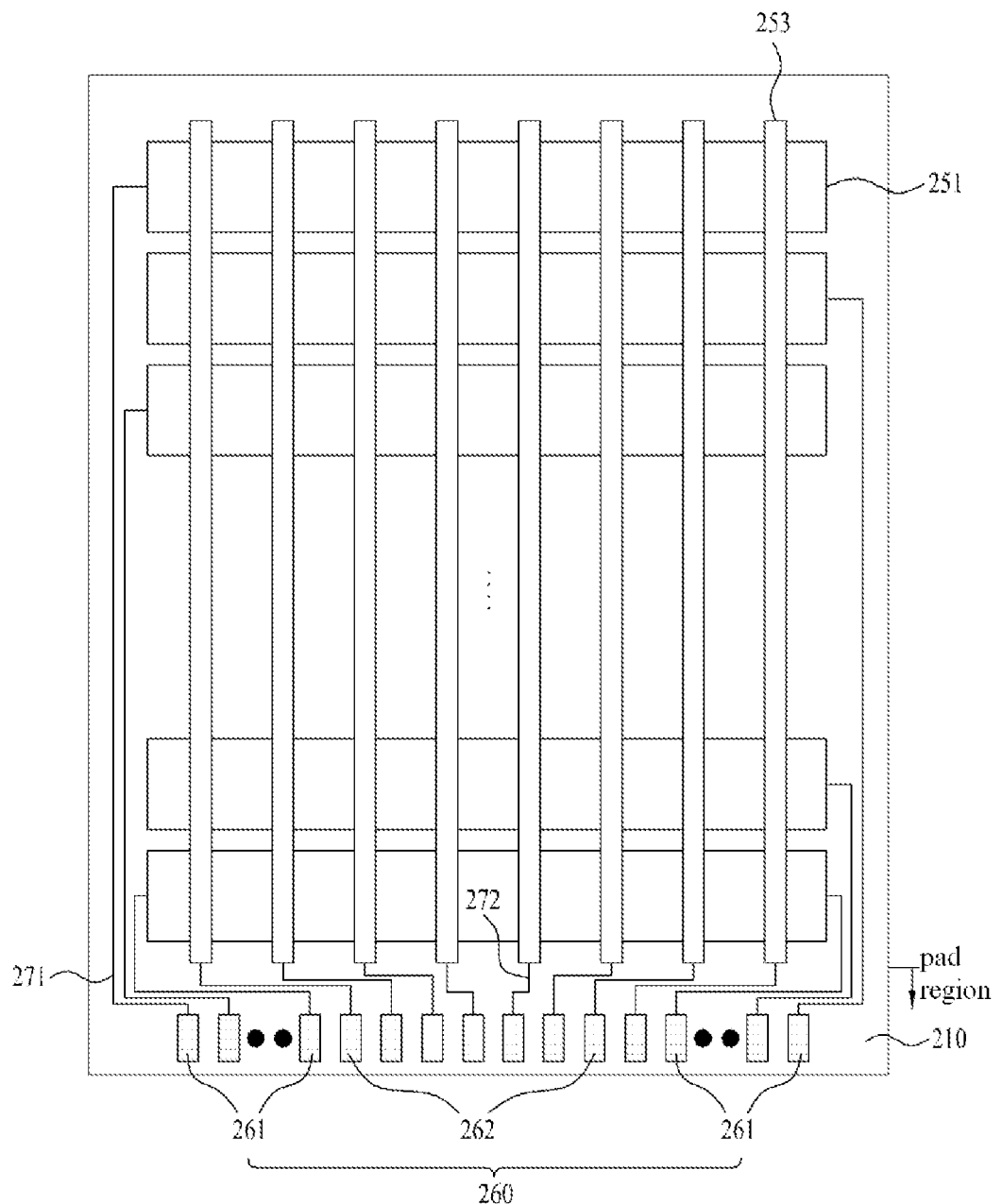
FIG. 6 illustrates a plane view showing a touch and stereoscopic image lens layer in a stereoscopic liquid crystal display device having a touch panel according to a second embodiment of the present invention.

FIG. 6 illustrates a plane view showing a touch and stereoscopic image lens layer in a stereoscopic liquid crystal display device having a touch panel according to a second embodiment of the present invention. And, FIG. 7 illustrates a detailed cross-sectional view of the stereoscopic liquid crystal display device having a touch panel according to the second embodiment of the present invention.

Figure 7:
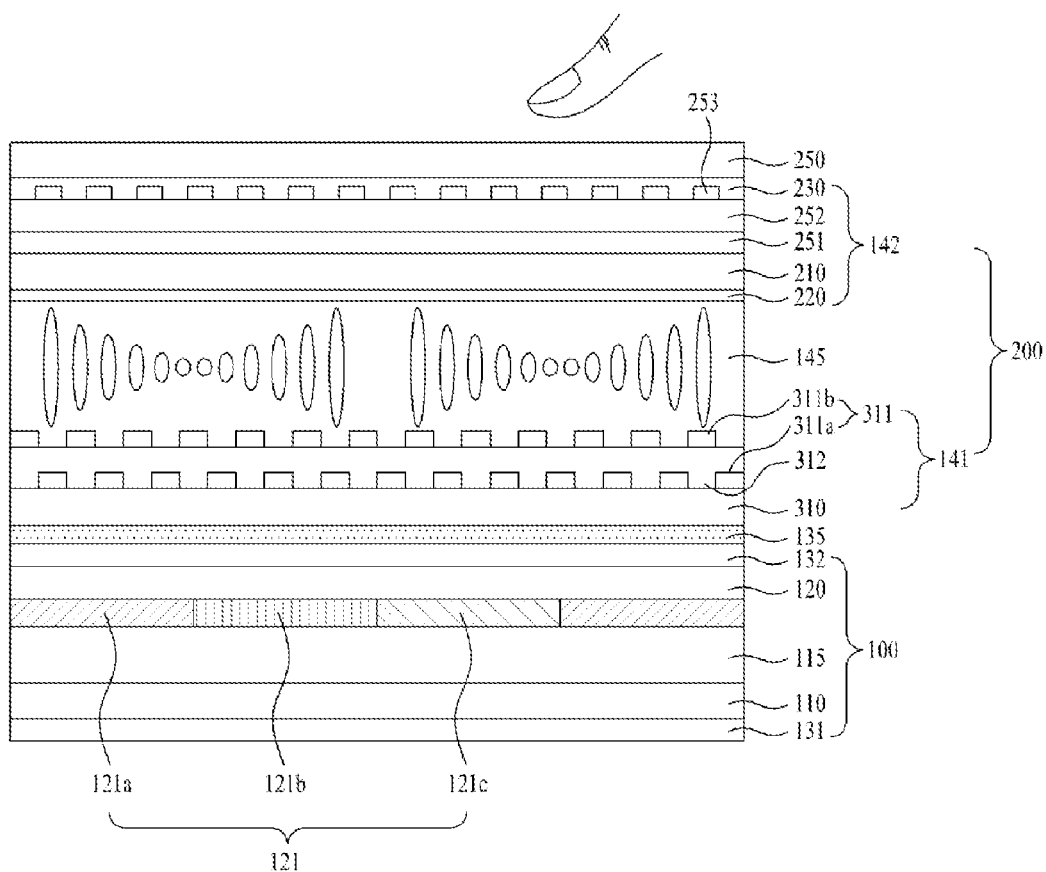
FIG. 7 illustrates a detailed cross-sectional view of the stereoscopic liquid crystal display device having a touch panel according to the second embodiment of the present invention

In comparison with the above-described stereoscopic liquid crystal display device having a touch panel according to the first embodiment of the present invention, in the stereoscopic liquid crystal display device having a touch panel according to the second embodiment of the present invention, the structure of the fourth substrate 210 having the touch function is configured differently, which shown in FIG. 6 and FIG. 7.

More specifically, referring to FIG. 6 and FIG. 7, the third electrode 251 is formed along the X-axis, first insulating layer 252 is formed on the fourth substrate 210 so as to cover the third electrode 251 along the Y-axis, and the fourth electrode 253 is formed on the first insulating 252.

Herein, FIG. 6 and FIG. 7 show an example of the fourth substrate 210 being elongated to one side so as to define a pad unit on an inner side of the projected (or elongated) portion. The pad unit includes a plurality of pads 260 (261 and 262) formed so as to apply a signal to each of the third electrode 251 and the fourth electrode 253, and each of the plurality of pads 260 is respectively connected to the third electrode 251 and the fourth electrode 253 through connection lines 271 and 272.

Additionally, the plurality of pads 260 (261 and 262) is connected to a touch panel signal applying unit formed of a soft flexible printed cable (FPC) through soldering.

Detailed description of the parts that are identical to the above-described stereoscopic liquid crystal display device having a touch panel according to the first embodiment of the present invention, including the cover glass 250, will be omitted for simplicity.

Furthermore, in the above-described embodiments of the present invention, in forming the touch and electrically-driven liquid crystal lens layer, electrodes (first electrodes and second electrode) for driving the lens are formed on surfaces facing into the liquid crystal layer for the lens layer are formed, and electrodes (third electrode and fourth electrode) for detecting a touch on an upper layer of a substrate that does not face into the liquid crystal layer are provided. Accordingly, a touch panel and an electrically-driven liquid crystal lens may be formed on a single panel, so that neither the touch panel nor the electrically-driven liquid crystal lens can influence the forming of the electric field.

And, depending upon application (or supply) of voltage for driving the electrically-driven liquid crystal lens, two-dimensional/three-dimensional (2D/3D) display switching may be realized. Whenever required, two-dimensional display and three-dimensional display switching may be enabled, and such switching is useful for various multi-player display or text display.

As described above, the stereoscopic liquid crystal display device having a touch panel and the method for manufacturing the same have the following advantages.

By forming a touch panel and a lens layer for displaying stereoscopic images within a single panel, so as to configure a display device performing a touch function and a stereoscopic image display function at the same time, the number of glasses and adhesion layers may be decreased and other structures may be omitted, thereby enabling the display device to be created in a slimmer size.

Also, in forming the touch and electrically-driven liquid crystal lens layer, electrodes driving the lens may be formed on surfaces facing into the liquid crystal layer for the lens layer, and by providing the surface that does not face into the liquid crystal layer with electrodes for detecting a touch, the touch panel and electrically-driven liquid crystal lens may be formed on a single panel without influencing the electric field.

And, depending upon application (or supply) of voltage for driving the electrically-driven liquid crystal lens, two-dimensional/three-dimensional (2D/3D) display switching may be realized. And, whenever required, two-dimensional display and three-dimensional display switching may be enabled, and such switching is useful for various multi-player display or text display.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A stereoscopic liquid crystal display device, comprising:
   a liquid crystal panel configured by including a first substrate and a second substrate facing into each other, and a first liquid crystal layer filled between the first and second substrates;
   an adhesion layer formed on the liquid crystal panel; and
   a touch and stereoscopic image lens layer as a single panel formed on the adhesion layer including a third substrate and a fourth substrate facing into each other and a second liquid crystal layer between the third and fourth substrates, a plurality of first electrodes formed at each lens region on the third substrate, a second electrode formed on an entire surface of an inner surface of the fourth substrate facing into the second liquid crystal layer, and a third electrode and a fourth electrode formed on an outer surface of the fourth substrate for detecting a touch position, wherein the first electrodes comprise a first group of first electrodes directly on the third substrate and a second group of first electrodes formed on a different layer from the first group, and the first and second group of first electrodes are alternately positioned,
   wherein an electrically-driven liquid crystal lens is defined in the touch and stereoscopic image lens layer by applying a voltage value gradually increasing from a center portion to an edge portion for each lens region to the first electrodes, and by applying a voltage value to the second electrode as the same voltage value with the applied voltage value to the center portion of the first electrode.

2. The stereoscopic liquid crystal display device of claim 1, further comprising a cover glass on an uppermost portion of the touch and stereoscopic image lens layer.

3. The stereoscopic liquid crystal display device of claim 1, wherein the third electrode and the fourth electrode of the touch and stereoscopic image lens layer are formed on the same layer and spaced apart from one another.

4. The stereoscopic liquid crystal display device of claim 3, further comprising:
   a third electrode connecting pattern on the third substrate; and
   a first insulating layer covering the third electrode connecting pattern, having a first contact hole on one portion of the third electrode connecting pattern, and formed on an entire surface of the third substrate,
   wherein the third electrode is connected to the third electrode connecting pattern through the first contact hole.

5. The stereoscopic liquid crystal display device of claim 1, wherein the third electrode and the fourth electrode are formed on different layers and having the first insulating layer placed therebetween, and wherein the third electrode and the fourth electrode are formed crossing each other.

6. The stereoscopic liquid crystal display device of claim 1, wherein the first electrodes are formed in the same alignment at a period of one pitch of a lens.

7. The stereoscopic liquid crystal display device of claim 1, wherein the first to fourth electrodes are each formed of a transparent electrode.

8. A method of manufacturing a stereoscopic liquid crystal display device, comprising:
   configuring a liquid crystal panel by including a first substrate and a second substrate facing into each other, and a first liquid crystal layer filled between the first and second substrates;
   forming a touch and stereoscopic image lens layer as a single panel, wherein the step of forming the touch and stereoscopic image lens layer includes: forming a plurality of first electrodes at each lens region on a third substrate; forming a second electrode entirely formed on one surface of a fourth substrate; forming a third electrode and a fourth electrode formed on the other surface of the fourth substrate for detecting a touch position; facing the first electrodes of the third substrate and the second electrode on the one surface of the fourth substrates into each other; and, forming a second liquid crystal layer between the third and fourth substrates; and bonding the liquid crystal panel and the touch and stereoscopic image lens layer with an adhesion layer positioned between the liquid crystal panel and the touch and stereoscopic image lens layer, wherein an electrically-driven liquid crystal lens is defined in the touch and stereoscopic image lens layer by applying a voltage value gradually increasing from a center portion to an edge portion for each lens region to the first electrodes, and by applying a voltage value to the second electrode as the same voltage value with the applied voltage value to the center portion of the first electrode.

9. The method of claim 8, further comprising:

forming a cover glass on an uppermost portion of the touch and stereoscopic image lens layer.

\* \* \* \* \*